(12) United States Patent
Leccia et al.

(10) Patent No.: US 8,982,538 B2
(45) Date of Patent: Mar. 17, 2015

(54) POLE UNIT GUIDE

(71) Applicant: Eaton Corporation, Cleveland, OH (US)

(72) Inventors: Brad Robert Leccia, Bethel Park, PA (US); Steven Castelein, Cumming, GA (US); Francois Jean Marchand, Saint-Jean-sur-Richelieu (CA)

(73) Assignee: Eaton Corporation, Cleveland, OH (US)

( * ) Notice: Subject to any disclaimer, the term of this patent is extended or adjusted under 35 U.S.C. 154(b) by 194 days.

(21) Appl. No.: 13/707,710

(22) Filed: Dec. 7, 2012

(65) Prior Publication Data

US 2014/0160635 A1   Jun. 12, 2014

(51) Int. Cl.
*H02B 1/30* (2006.01)
*H02B 11/04* (2006.01)
*H02B 11/12* (2006.01)

(52) U.S. Cl.
CPC ................ *H02B 11/04* (2013.01); *H02B 11/12* (2013.01)
USPC ........... 361/605; 361/608; 361/611; 361/614; 361/631; 218/119; 218/120; 200/50.21; 200/50.24; 200/50.26; 312/223.2; 312/223.6

(58) Field of Classification Search
CPC ............ H02B 1/30; H02B 1/21; H02B 11/00; H02B 13/00; H01H 33/022; H01H 1/42; H01H 33/666
USPC ......... 361/601, 604–608, 611, 612, 614, 617, 361/621, 631, 632, 634, 636; 200/50, 200/50.12, 50.21, 50.22, 50.27, 293, 507; 218/139, 140, 153, 155, 119, 120, 10, 218/14; 439/546, 587; 312/223.2, 223.6
See application file for complete search history.

(56) References Cited

U.S. PATENT DOCUMENTS

| | | | | |
|---|---|---|---|---|
| 1,885,265 A | * | 11/1932 | Jackson | 415/29 |
| 2,128,149 A | * | 8/1938 | Linde | 361/607 |
| 2,176,718 A | * | 10/1939 | Linde | 439/252 |
| 2,190,952 A | * | 2/1940 | Rossman | 361/606 |
| 2,218,555 A | * | 10/1940 | Rossman | 361/608 |
| 2,544,761 A | * | 3/1951 | Kilminster | 361/631 |
| 2,654,055 A | * | 9/1953 | Kilminster | 361/632 |
| 3,188,415 A | * | 6/1965 | Netzel | 200/50.24 |
| 3,527,911 A | * | 9/1970 | Sharp | 218/119 |
| 3,899,722 A | * | 8/1975 | Cadez et al. | 361/606 |
| 4,768,132 A | * | 8/1988 | Prietzel et al. | 361/614 |

(Continued)

*Primary Examiner* — Michail V Datskovskiy
(74) *Attorney, Agent, or Firm* — Eckert Seamans Cherin & Mellott, LLC; David C. Jenkins (57) ABSTRACT

A guide assembly for a switchgear assembly is provided. The guide assembly includes an elongated support member and a passage. The support member is coupled to and extends from a housing assembly rear sidewall. The support member extends in the circuit breaker assembly direction of travel. The passage is disposed on the circuit breaker assembly base and also extends in the circuit breaker assembly direction of travel. The support member is substantially aligned with the passage. In this configuration, as the circuit breaker assembly moves between a withdrawn position and an installed position, the support member moves between a first position, wherein the support member is not disposed in the passage, and a second position, wherein the support member is partially disposed in the passage. When the support member is in the second position, the support member bears a portion of the weight of the circuit breaker assembly base.

13 Claims, 5 Drawing Sheets

(56) References Cited

U.S. PATENT DOCUMENTS

| | | | |
|---|---|---|---|
| 5,434,369 A * | 7/1995 | Tempco et al. | 200/50.26 |
| 6,685,072 B2 * | 2/2004 | Ho | 224/629 |
| 7,425,687 B2 * | 9/2008 | Morita et al. | 218/120 |
| 7,479,612 B2 * | 1/2009 | Waldi et al. | 200/507 |
| 7,903,393 B2 * | 3/2011 | Buxton et al. | 361/608 |
| 8,008,594 B2 * | 8/2011 | Kurogi et al. | 218/119 |
| 8,178,801 B2 * | 5/2012 | Yanniello et al. | 200/293 |
| 8,248,760 B2 | 8/2012 | Abrahamsen et al. | |
| 8,411,418 B2 * | 4/2013 | Kikukawa et al. | 361/611 |
| 8,525,053 B2 * | 9/2013 | Abrahamsen et al. | 200/50.21 |
| 2004/0004796 A1 * | 1/2004 | Tresy et al. | 361/62 |
| 2006/0118320 A1 * | 6/2006 | Josten et al. | 174/50 |
| 2012/0006661 A1 | 1/2012 | Abrahamsen et al. | |
| 2012/0127636 A1 | 5/2012 | Abrahamsen et al. | |

* cited by examiner

POLE UNIT GUIDE

BACKGROUND OF THE INVENTION

1. Field of the Invention

The disclosed concept relates to a switch arrangement for an electrical switchgear.

2. Background Information

As is well known, a switchgear is an integrated assembly of switches, circuit breakers, buses (i.e., power supply rails), fuses and other components used to isolate electrical equipment at an electrical installation, for example, an electrical power substation. A switchgear is used to both de-energize equipment to allow work to be done and to clear faults downstream of the switchgear. The switchgear is often housed in a metal housing assembly at the installation. A circuit breaker assembly includes a base and one or more elongated switching elements, such as, but not limited to, vacuum interrupters. The switching element includes an internal set of separable contacts. That is, the switching element may be open or closed as is known. Further, the switching element includes two external contacts, one at the proximal end and one at the distal end The circuit breaker assembly is structured to move between various positions relative to the housing assembly including a first withdrawn position and a second fully inserted position. The circuit breaker assembly may also be placed in various intermediate positions, as discussed below. The switching elements extend from the circuit breaker assembly base in a cantilever manner with the longitudinal axis extending generally horizontally. Accordingly, as used herein, the end of the switching element adjacent, or directly coupled to, the circuit breaker assembly base is the proximal end and the end of the switching element spaced from the circuit breaker assembly base is the distal end. Unless otherwise noted, this convention will be used with other elements of the switchgear as described below.

In one embodiment of a switchgear, the housing assembly includes a conductor assembly including a number of conductive buses, a contact insulator, and a number of contacts. The contact insulator is, in an exemplary embodiment, an elongated hollow, non-conductive body or segmented body assembly. The longitudinal axis of each contact insulator is generally aligned with longitudinal axis of a movable switching element. Thus, as the circuit breaker assembly moves between the positions noted above, the switching element is moving longitudinally in and out of, and through, the contact insulator. Accordingly, the contact insulator includes a proximal end that is closer to the circuit breaker assembly base and a distal end that is spaced from the circuit breaker assembly base. Further, the contact insulator includes a medial portion.

Within the contact insulator hollow body there are three contact assemblies. The contact insulator contact assemblies are spaced apart substantially the same distance as the switching element contacts. The contact insulator contact assemblies are disposed as follows: one contact assembly at the proximal end, one contact assembly in the medial portion, and one contact assembly at the distal end. The various contact assemblies are coupled to, and in electrical communication with, the conductive buses. The conductive buses are further coupled to, and in electrical communication with a line, a load, or a ground. For example, the distal contact assembly is typically coupled via a conductive bus to, and is in electrical communication with, a line. The medial contact assembly is typically coupled via a conductive bus to, and is in electrical communication with, a load. The proximal contact assembly may be coupled via a conductive bus to, and be in electrical communication with, a secondary line or a ground. As used herein as an example, the proximal contact is coupled via a conductive bus to a ground.

The switching elements and the contact insulators typically have a generally circular cross-section. Thus, the switching element contacts and the contact insulator contact assemblies are typically circular as well. The contact insulator contact assemblies are slightly larger than the switching element contacts so as to allow the switching element contacts to move through the contact insulator contact assemblies. The contact insulator contact assemblies cannot, however, be too much larger than the switching element contacts as the contacts must actually contact each other when coupled. This is a disadvantage when the switching, element is not substantially aligned with the contact insulator, i.e., when the longitudinal axis of the switching element is not substantially aligned with the longitudinal axis of the contact insulator. When a misalignment occurs, the switching element contacts may not pass through, or into, the contact insulator contact assemblies. Rather, the switching element contacts may engage, catch, or bind, upon the axial face of the contact insulator contacts.

There is, therefore, a need for an electrical switchgear structured to align a switching element with a contact insulator so that the switching element may pass through the contact insulator.

SUMMARY OF THE INVENTION

According to the disclosed concept, a guide assembly is provided. The switchgear assembly includes a housing assembly, a circuit breaker assembly, and the guide assembly. The housing assembly includes a rear sidewall and a number of hollow, elongated contact insulators, the longitudinal axis of each the contact insulator extending generally horizontally and generally normal to the rear sidewall. The circuit breaker assembly includes a base and a number of switching elements, each switching element including an elongated body extending generally horizontally from the base. The longitudinal axis of each switching element is substantially aligned with a longitudinal axis of a contact insulator. The circuit breaker assembly is structured to move between two positions, a first withdrawn position, wherein the switching elements are not disposed within the contact insulators, and a second inserted position, wherein the switching elements are disposed within the contact insulators.

The guide assembly includes an elongated support member and a passage. The support member is coupled to and extends from the housing assembly rear sidewall. The support member extends in the circuit breaker assembly direction of travel, i.e. generally horizontally in the disclosed configuration. The passage is disposed on the circuit breaker assembly base and also extends in the circuit breaker assembly direction of travel. The support member is substantially aligned with the passage. In this configuration, as the circuit breaker assembly moves between the first and the second positions, the support member moves between a first position, wherein the support member is not disposed in the passage and a second position, wherein the support member is partially disposed in the passage. When the support member is in the second position, the support member bears a portion of the weight of the circuit breaker assembly base.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as, but not limited to, "forward," "back," "right" "left," "upper" "lower," and "lateral" correspond to the orientation of the utility cart from the perspective of a user standing, at the handle portion looking toward the tray that is, the normal position a user would occupy to move the utility cart. Such directional terms are not limiting upon the claims.

As used herein, the singular form of "a," "an," and "the" include plural references unless the context clearly dictates otherwise. Further, as used herein, the phrase "a number" or variations thereof means one or an integer greater than one.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, "correspond" indicates that two structural components are sized and shaped to contact or engage each other with a minimum amount of friction or to generally fit together. For example, an opening, which "corresponds" to a member is sized slightly larger than the member so that the member may pass through the opening with a minimum amount of friction.

As used herein, "at" means on or near.

As used herein, "semi-rigid" means that an element may be flexed when a bias is applied thereto, but will return to its original shape when the bias is removed.

As used herein, "unitary" means a component is created as a single piece or unit. That is, a component that includes pieces that are created separately and then coupled together as a unit is not a "unitary" component or body.

Figure 1:
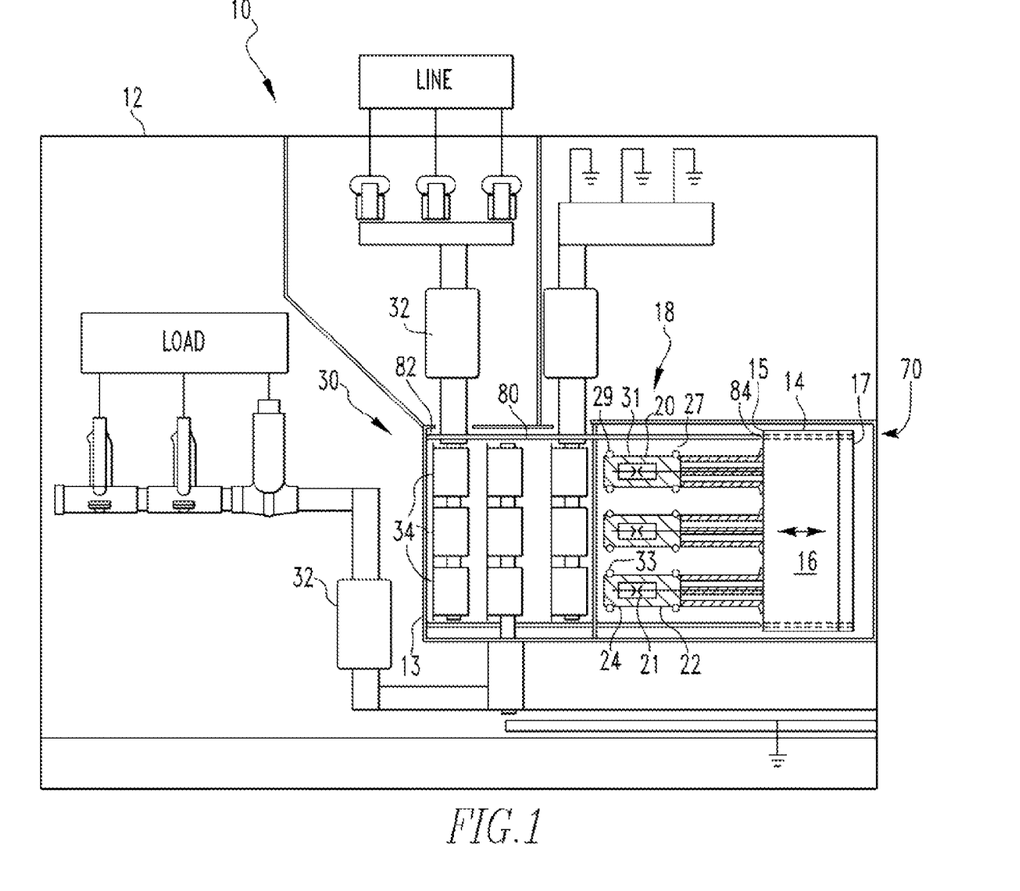
FIG. 1 is a schematic side view of a switchgear.

As shown schematically in FIG. 1, a switchgear 10 includes a housing assembly 12 and a circuit breaker assembly 14. The housing assembly 12 is, in an exemplary embodiment, sized to enclose the circuit breaker assembly 14. The housing assembly 12 includes a rear sidewall 13. As discussed below, the circuit breaker assembly 14 moves into, and out of, the housing assembly 12. As used herein, the rear sidewall 13 is the wall of the housing assembly 12 that the circuit breaker assembly 14 moves toward as the circuit breaker assembly 14 moves into the housing assembly 12. Elements of the guide assembly 70 that may be part of the housing assembly 12 are discussed below.

The circuit breaker assembly 14 includes a base 16 and a number of switching elements 18. The switching elements 18 may be, but are not limited to, vacuum circuit breakers 20. Switching elements 18, such as vacuum circuit breakers 20, include internal contacts 21 that may be disposed in an open, first position, or a closed, second position. In one embodiment, the circuit breaker assembly 14 includes three switching elements 18. The number of switching elements 18, however, is not relevant to the invention disclosed below so the following description will describe a single switching: element 18. It is understood, however, that additional switching elements 18 may be part of the circuit breaker assembly 14. As discussed below, the switching element 18 extends from the circuit breaker assembly base 16. Thus, the circuit breaker assembly base 16 has a switching element side 15 and a non-switching element side 17. As used herein, the "depth" of the circuit breaker assembly base 16 is the distance between the switching element side 15 and the non-switching element side 17. Elements of the guide assembly 70 that may be unitary with the circuit breaker assembly 14 are discussed below.

The switching, element 18 is elongated and, in an exemplary embodiment, the longitudinal axis of the switching element 18 extends generally horizontally from the circuit breaker assembly base 16. The switching element 18 extends in a cantilever manner from the circuit breaker assembly base 16. As such, the switching element 18 includes a proximal, first end 22, disposed adjacent the circuit breaker assembly base 16, and, a distal second end 24, disposed away from the circuit breaker assembly base 16. Unless otherwise noted, this convention will be used with other elements of the switchgear 10 as described below. That is, elements that are generally closer to the circuit breaker assembly base 16 will be described as "proximal" and those elements spaced from the circuit breaker assembly base 16 will be described as "distal."

A first contact 27 is disposed at the switching element first end 22 and a second contact 29 is disposed at the switching element second end 24. Each switching element contact 27, 29 is in electrical communication with one of the internal contacts 21. Thus, when the internal contacts 21 are in the closed, second position, electricity may pass through the switching element 18 via the first and second switching element contacts 27, 29. In an exemplary embodiment, the switching element 18 has a body 31 with a generally circular cross-section. In an exemplary embodiment, the first and second switching element contacts 27, 29 extend about the outer surface of the switching element body 31. The first and second switching element, contacts 27, 29 include a conductive body 23. When the switching element 18 has a generally circular cross-section, the first and second switching element contacts 27, 29 are generally toroidal and extend about the switching element 18. In one exemplary embodiment, the switching element first and second contacts 27, 29 are spring-like coils 33 that are wrapped about the switching element body 31. That is, the switching element body 31 may include a first end groove 35 and a second end groove 37. The first and second switching element contacts 27, 29 are sized, i.e. have a diameter, to correspond to the width of the switching element body first and second grooves 35, 37. The switching element body first and second grooves 35, 37 have a depth that is less than the diameter of the first and second switching element contacts 27, 29. In this configuration, a portion of the first and second switching element contacts 27, 29 extends above the switching element body first and second grooves 35, 37. Further, the first and second switching element contacts 27, 29 are compressible due to the nature of a coiled body 31.

Figure 2A:
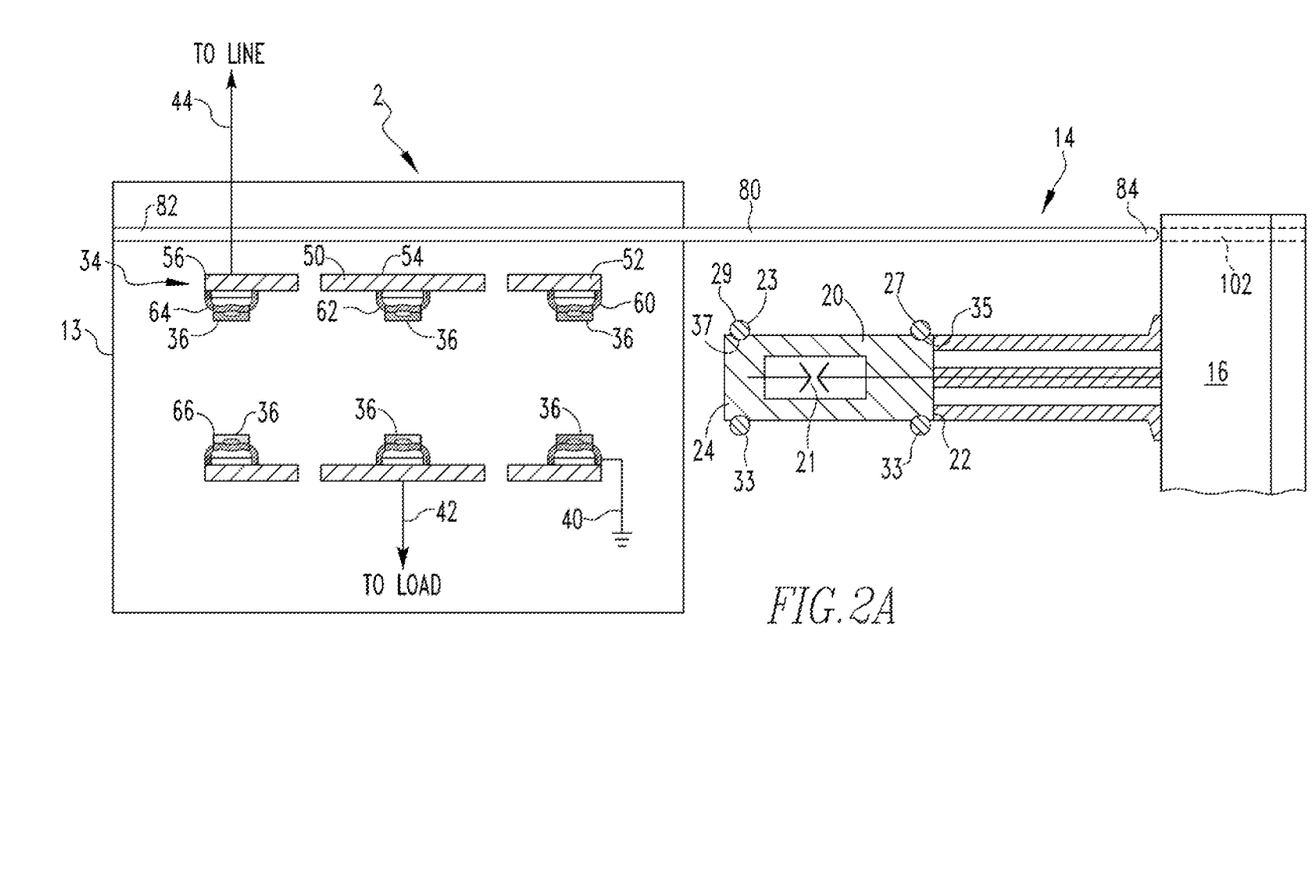
FIG. 2A is a schematic side view of switching element in a first position.
Figure 2B:
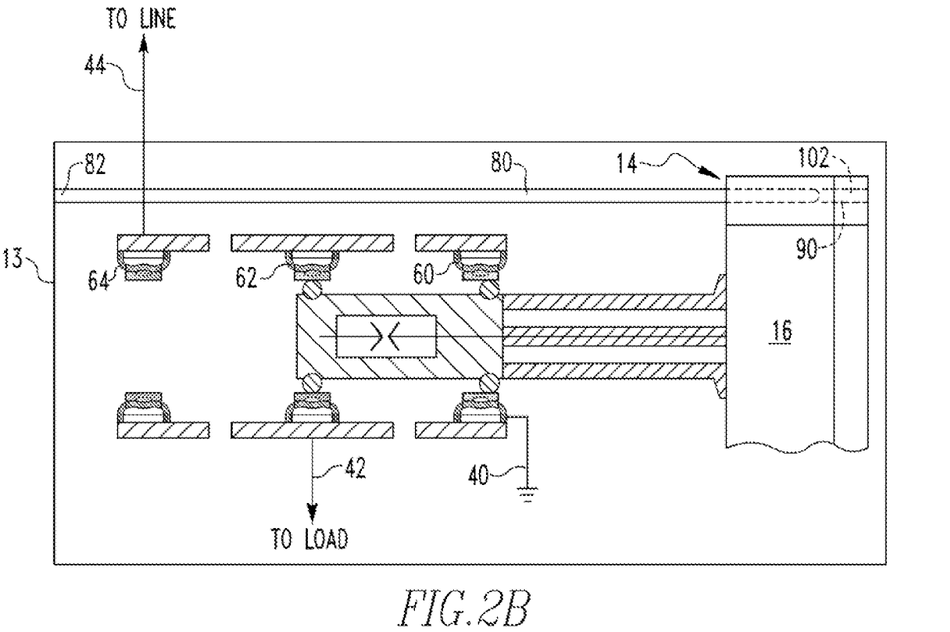
FIG. 2B is a schematic side view of switching element in an intermediate position.
Figure 2C:
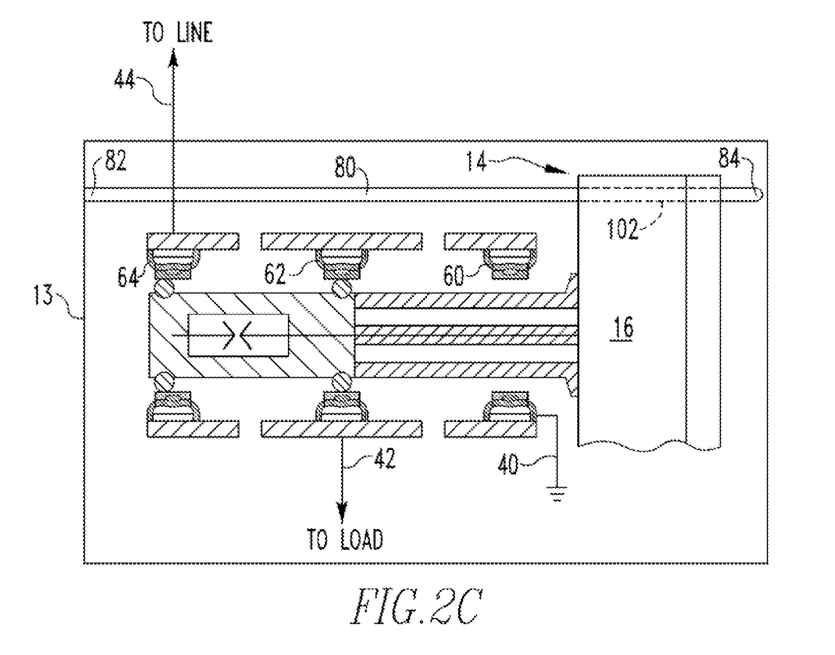
FIG. 2C is a schematic side view of switching element in a second position.

The circuit breaker assembly 14 is structured to move generally linearly between two positions, with a number of intermediate positions, as shown in FIGS. 2A-2C. A first position is a fully withdrawn position, wherein the circuit breaker assembly 14 is fully withdrawn from the housing assembly 12. A second position is any intermediate position wherein the circuit breaker assembly 14 is between the fully withdrawn first position and a fully inserted position. A third position is a fully inserted position, wherein the circuit breaker assembly 14 is disposed fully within the housing assembly 12 and the switching elements 18 are in their second positions, as described below. The circuit breaker assembly 14, and more specifically, the circuit breaker assembly base 16, may be supported by a movable carriage (not shown) or by wheels structured to travel over rails not shown) disposed in the housing assembly 12. In an exemplary embodiment, such rails are disposed on the lateral sides of the circuit breaker assembly base 16.

The housing assembly 12 includes a conductor assembly 30. The conductor assembly 30 includes a number of conductive buses 32, contact insulators 34, and contact assemblies 36. Again, it is noted that the present description relates to a single switching, element 18; it is understood that each switching element 18 will have associated elements of the conductor assembly 30. That is, the following description will describe the elements of the conductor assembly 30 associated with a single switching element 18. In an embodiment with multiple switching elements 18, each switching element 18 will have similar elements of the conductor assembly 30 associated therewith.

In an exemplary embodiment, the number of conductive buses 32 includes a first bus 40, a second bus 42, and a third bus 44. Each bus 40, 42, 44 is coupled to, and in electrical communication with one of a ground, load, and line (not shown). In the exemplary embodiment shown, the first bus 40 is coupled to, and in electrical communication with a ground, the second bus 42 is coupled to, and in electrical communication with a load, and the third bus 44 is coupled to, and in electrical communication with a line. It is understood that this is an exemplary embodiment and other embodiments may exist. For example, instead of a first bus 40 coupled to a around, the first bus 40, may be coupled to a secondary line (not shown). Each bus 40, 42, 44 is further coupled to, and in electrical communication with, a contact assembly 36 as described below. It is noted that there may be additional conductive buses 32 in the conductor assembly 30.

There is one contact insulator 34 associated with each switching element 18. Each contact insulator 34 is an elongated hollow body 50 sized to be disposed about a switching element 18. That is, each contact insulator 34 has a cross-sectional area that corresponds to the shape of the switching element 18. Thus, in an exemplary embodiment including a switching element 18 having a generally circular cross-section, the contact insulator 34 also has a generally circular cross-section with an interior diameter that is slightly larger than the switching element 18. The contact insulator body 50 may be a single body, or, may be a segmented body as shown. The contact insulator 34 is disposed in a generally horizontal orientation. That is, the longitudinal axis of the contact insulator 34 is generally horizontal. The contact insulator 34 is disposed within the housing assembly 12 with the contact insulator 34 longitudinal axis being generally aligned with the switching element 18 longitudinal axis. The contact insulator 34 is disposed within the housing assembly 12 so that, when the circuit breaker assembly 14 is in the withdrawn, first position, the switching element 18 is spaced from the contact insulator 34, and, when the circuit breaker assembly 14 is in the inserted, third position, the switching element 18 is substantially disposed within the contact insulator 34. The intermediate positions of the switching, element 18 are discussed below.

The contact insulator 34 has a proximal end 52, a medial portion 54, and a distal end 56. The contact insulator proximal end 52 is disposed adjacent the circuit breaker assembly base 16. The contact insulator medial portion 54 is disposed between the contact insulator proximal end 52 and the contact insulator distal end 56. The contact insulator distal end 56 is spaced from the circuit breaker assembly base 16.

As noted above, there is one contact assembly 36 coupled to, and in electrical communication with, each bus 40, 42, 44. Thus, in this exemplary embodiment, there are three contact assemblies 36. A first contact assembly 60, is disposed at the contact insulator proximal end 52, a second contact assembly 62 is disposed at the contact insulator medial portion 54, and a third contact assembly 64 is disposed at the contact insulator distal end 56. The contact assemblies 60, 62, 64 are spaced apart by substantially the same length that the first and second switching element contacts 27, 29 are spaced. That is, the first contact assembly 60 is spaced from the second contact assembly 62 by substantially the same length that the first and second switching element contacts 27, 29 are spaced, and, the second contact assembly 62 is spaced from the third contact assembly 64 by substantially the same length that the first and second switching element contacts 27, 29 are spaced.

The first contact assembly 60 is coupled to, and in electrical communication with, the first bus 40. Thus, in the exemplary embodiment, the first contact assembly 60 is coupled to, and in electrical communication with, a ground. The second contact assembly 62 is coupled to, and in electrical communication with, the second bus 42. Thus, in the exemplary embodiment, the second contact assembly 62 is coupled to, and in electrical communication with, a load. The third contact assembly 64 is coupled to, and in electrical communication with, the third bus 44. Thus, in the exemplary embodiment, the third contact assembly 64 is coupled to, and in electrical communication with, a line.

The contact insulator 34 is a hollow body 50, as noted above. The contact assemblies 60, 62, 64 are disposed about the inner surface of the contact insulator body 50. Thus, the contact assemblies 60, 62, 64, in the exemplary embodiment, have a generally circular cross-section. More specifically, the elements of the contact insulator contact assemblies 60, 62, 64 are generally toroidal bodies 66. As discussed above, the switching element 18 is disposed in a cantilever manner extending from the circuit breaker assembly base 16. In this configuration the circuit breaker assembly 14, or more specifically the switching, element 18, may not extend substantially horizontally. That is, the weight of the switching element 18, as well as other factors, may cause the circuit breaker assembly 14 to tilt, or otherwise become askew, relative to the circuit breaker assembly 14 support device, e.g. a carriage or lateral rails, as discussed above. In this configuration, the longitudinal axes of the switching element 18 and the contact insulator 34 are generally aligned.

Figure 3:
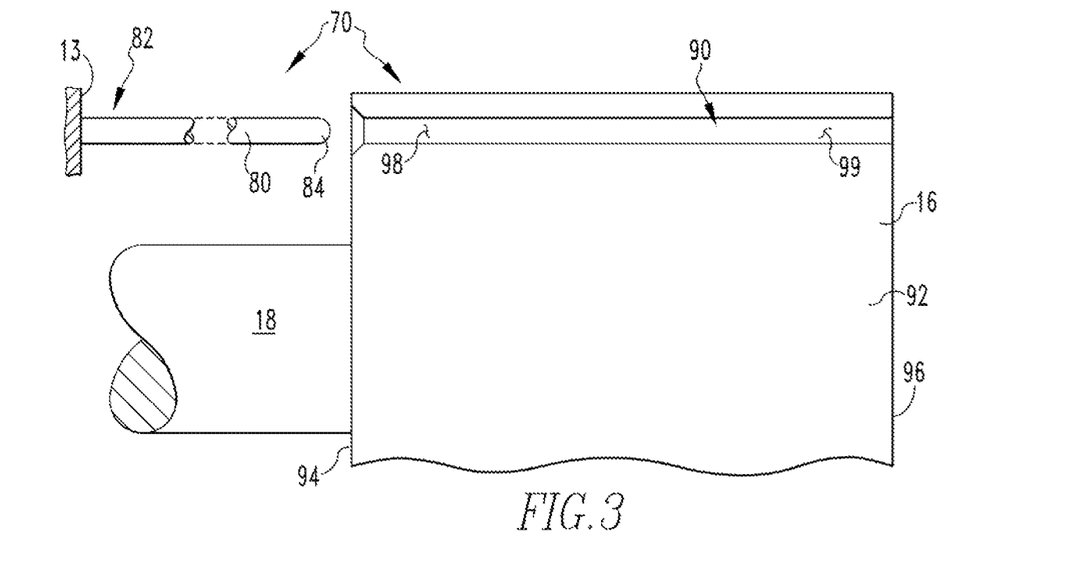
FIG. 3 is a schematic side view of a guide assembly.

A guide assembly 70 is structured to improved the alignment of the longitudinal axes of the switching element 18 and the contact insulator 34. The guide assembly 70 includes an elongated support member 80 and a passage 90. The support member 80 is coupled to, and in an exemplary embodiment directly coupled to, the housing assembly rear sidewall 13. The support member 80 extends substantially horizontally and in the direction of travel of the circuit breaker assembly base 16. The support member 80 extends in a cantilever manner from the housing assembly rear sidewall 13. That is, the support member 80 includes a proximal end 82 and a distal end 84. The support member proximal end 82 is coupled to, and in an exemplary embodiment directly coupled to, the housing assembly rear sidewall 13. Thus, with respect to the support member 80, the descriptive convention of the "proximal" end being closer to the circuit breaker assembly base 16 does not apply. The support member distal end 84 is, in an exemplary embodiment, tapered. As used herein, "tapered" includes a rounded contour.

The support member 80, in an exemplary embodiment, has a length that is between about 80% and 100% of the length of the switching element 18, and in another exemplary embodiment, about 89% of the length of the switching element 18. Thus, for a switching element 18 having a length of about 27.0 inches, the support member 80 has a length of between about 21.5 inches and 27.0 inches, or more specifically about 24.0 inches. The support member 80, in an exemplary embodiment is made from glass fiber wound rod and has a limited flexibility. Thus, the support member 80 will maintain its substantially horizontal orientation event when a weight is applied thereto.

The guide assembly passage 90 is disposed on the circuit breaker assembly base 16 and extends substantially horizontally and in the direction of travel of the circuit breaker assembly base 16. The passage 90 has two ends; a proximal end 98 and a distal end 99. As used herein, the passage proximal end 98 is the end at the circuit breaker assembly base housing switching element side 94. The passage proximal end 98 may be flared. That is, the passage 90 is sized to correspond to the size of the support member 80. The passage proximal end 98, however, may be flared so as to be larger than support member 80.

Figure 4:
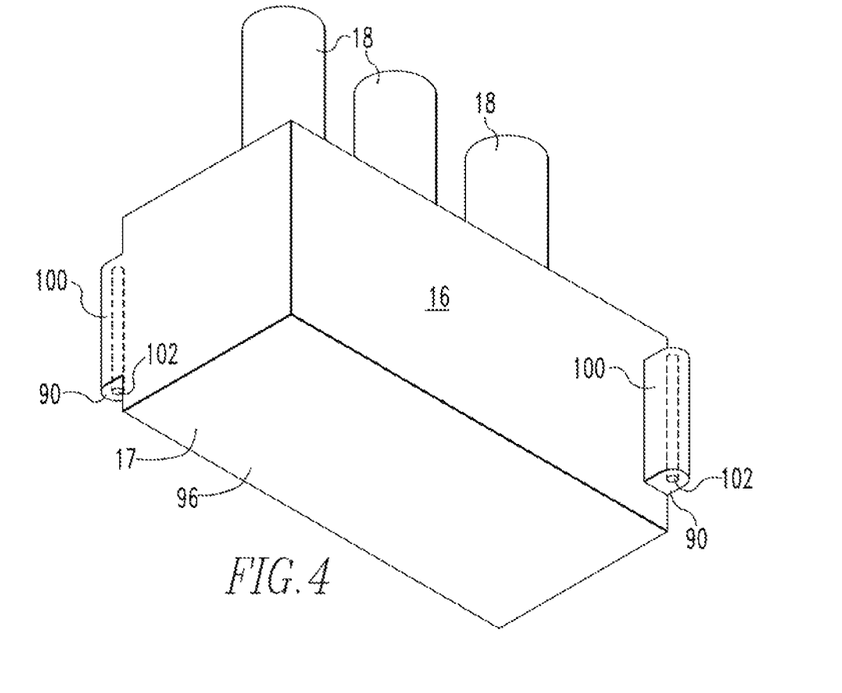
FIG. 4 is a schematic isometric view of an alternate embodiment of a guide assembly.

In one exemplary embodiment, not shown, circuit breaker assembly base 16 includes a housing 92 and the passage 90 is disposed through a medial portion of the circuit breaker assembly base housing 92. As with the circuit breaker assembly base 16, the circuit breaker assembly base housing 92 includes a switching element side 94 and a non-switching element side 96. In another exemplary embodiment, as shown in FIG. 4, circuit breaker assembly base housing 92 includes a protrusion 100. As shown, protrusion 100 is an extension having a semi-circular cross-section. It is understood that this shape is exemplary and protrusion 100 may have any cross-sectional shape.

In one exemplary embodiment, shown in FIG. 4, protrusion 100 extends over something less than the entire side of the circuit breaker assembly base housing 92. That is, while the protrusion 100 is elongated, it does not extend substantially the depth of the circuit breaker assembly base housing 92. In this embodiment, the protrusion 100 may be disposed at the circuit breaker assembly base housing switching, element side 94, at the circuit breaker assembly base housing non-switching element side 96, or anywhere in between. The protrusion 100 defines a passage 90; that is, an opening extends through the protrusion 100. In an alternative embodiment, not shown, the passage 90 has one closed end, i.e. it is a bore.

Figure 5:
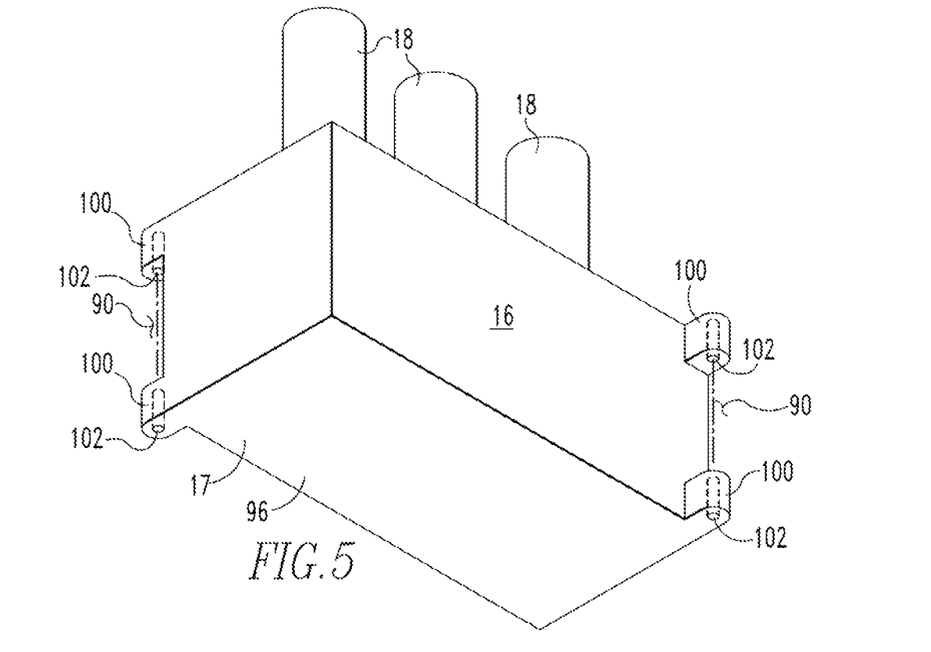
FIG. 5 is a schematic isometric view of an alternate embodiment of a guide assembly.

In another exemplary embodiment, shown in FIG. 5, protrusion 100 includes two spaced protrusions 100. The spaced protrusions 100 are generally horizontally aligned. Each of the spaced protrusions 100 includes an aperture 102. The apertures 102 are also generally horizontally aligned. Thus, in this embodiment, the passage 90 includes the openings defined in the spaced protrusions 100 as well as the space between the spaced protrusions 100. In this embodiment, each spaced protrusion 100 is disposed at one of the circuit breaker assembly base housing switching element side 94 or the circuit breaker assembly base housing non-switching element side 96.

Figure 6:
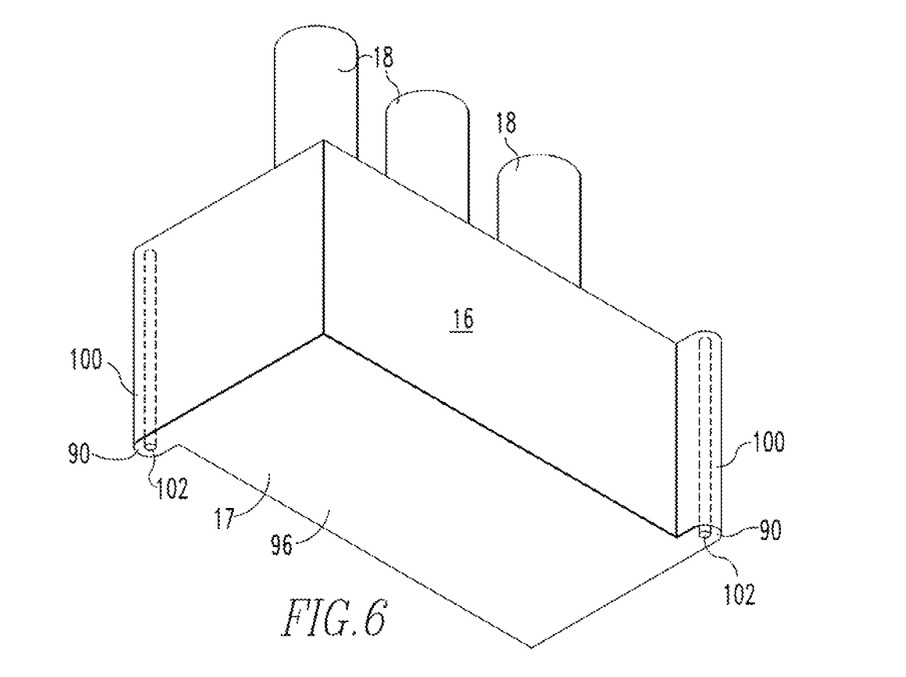
FIG. 6 is a schematic isometric view of an alternate embodiment of a guide assembly.

In another exemplary embodiment, shown in FIG. 6, protrusion 100 is elongated, extending substantially the depth of the circuit breaker assembly base housing 92. Further, in this embodiment, as well as arty embodiment described above, there may be two protrusions 100, or two pairs of aligned, spaced protrusions 100. In the exemplary embodiment, the circuit breaker assembly base housing 92 has a generally rectangular cross-section. The two protrusions 100 (or pairs of spaced protrusions) are disposed at opposite corners of the circuit breaker assembly base housing 92. That is, the protrusions 100 are caddy corner to each other.

In this configuration, the support member 80 may be disposed in at least three positions relative to the passage 90. These positions correspond to the positions of the circuit breaker assembly 14 relative to the housing assembly 12. That is, in a first position, the support member 80 is disposed outside of, and spaced from, the passage 90. In a second position, the support member 80 is disposed partially in the passage 90. In a third position, the support member is substantially disposed within the passage 90. When the support member is in the second position, the interaction between the support member 80 and the passage 90 causes the orientation of the circuit breaker assembly 14 to be improved because, when the support member 80 is in said second position, the support member 80 bears a portion of the weight of the circuit breaker assembly base housing 92. That is, the support member 80 and the passage 90 are substantially aligned, and because the support member is rigid, the interaction of the support member 80 and the passage 90 reorients the circuit breaker assembly 14 relative to the housing assembly 12 and, more specifically, moves the longitudinal axis of each switching element 18 to be substantially aligned with the longitudinal axis of a contact insulator 34.

Accordingly, the switchgear 10 may be placed in various positions as follows. It is noted that the switching element 18 may be configured with the internal contacts 21 in the open position during any movement of the circuit breaker assembly 14. The following will describe the switching element 18 moving into the contact insulator 34. As this occurs, the first and second switching element contacts 27, 29 are moved into, and out of, contact with the contact insulator contact assemblies 60, 62, 64. It is understood that when a switching element contact 27, 29 engages, i.e. is brought into contact with, a contact insulator contact assembly 60, 62, 64, the elements are placed in electrical communication with each other. As noted above, the longitudinal axes of the switching element 18 and the contact insulator 34 are generally aligned.

The circuit breaker assembly 14 may be in the first position initially. That is, the switching element 18 is disposed outside of the contact insulator 34. As the circuit breaker assembly 14 moves toward the third position, the support member 80 enters the passage 90. That is, the support member 80 moves into the second position. As noted above, this causes the longitudinal axis of switching element 18 to be substantially aligned with a longitudinal axis of a contact insulator 34. In this configuration, the switching element 18 is more likely to pass through, or into, the contact insulator contact assemblies 60, 62, 64. Thus, as the circuit breaker assembly 14 moves toward the third position, the switching element second contact 29, which is disposed at the switching element distal, second end 24, is initially moved into contact with the contact insulator first contact assembly 60. Thus, in this intermediate position, and in the exemplary embodiment, the switching element 18 is in electrical communication with the ground via the contact insulator first contact assembly 60 and the first bus 40.

As the circuit breaker assembly 14 continues to move toward the third position, the switching element second contact 29 disengages from the contact insulator first contact assembly 60. Further motion toward the circuit breaker assembly 14 third position causes the switching element second contact 29 to engage the contact insulator second contact assembly 62 while the switching element first contact 27 engages the contact insulator first contact assembly 60. In this intermediate position, and in the exemplary embodiment, the load is grounded via the switching element 18. That is, the load is coupled to, and in electrical communication with the switching element 18 via the second bus 42 and contact insulator second contact assembly 62 while the switching element 18 is grounded via the contact insulator first contact assembly 60 and the first bus 40.

As the circuit breaker assembly 14 continues to move toward the third position, the switching element second contact 29 disengages from the contact insulator second contact assembly 62 and the switching element first contact 27 disengages from the contact insulator first contact assembly 60. Moving the circuit breaker assembly 14 to the third position causes the switching element second contact 29 to engage the contact insulator third contact assembly 64 while the switching element first contact 27 engages the contact insulator second contact assembly 62. In the third position, and in the exemplary embodiment, the line is coupled to the load via the switching element 18. That is, the line is coupled to, and in electrical communication with the switching element 18 via the third bus 44 and contact insulator third contact assembly 64, while the switching element 18 is coupled to the load via the contact insulator second contact assembly 62 and the second bus 42.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A guide assembly for a switchgear assembly, said switchgear assembly including a housing assembly and a circuit breaker assembly, said housing assembly including a rear sidewall and a number of hollow, elongated contact insulators, the longitudinal axis of each said contact insulator extending generally horizontally and generally normal to said rear sidewall, said circuit breaker assembly including a base and a number of switching elements, each said switching element including an elongated body extending generally horizontally from said base, and wherein the longitudinal of each switching element is generally aligned with a longitudinal axis of a contact insulator, said circuit breaker assembly structured to move between two positions, a first withdrawn position, wherein said switching elements are not disposed within said contact insulators, and a second inserted position, wherein said switching elements are disposed within said contact insulators, said guide assembly comprising:
a guide assembly including an elongated support member and a passage, said support member coupled to and extending from said housing assembly rear sidewall and extending substantially horizontally, said passage disposed on said circuit breaker assembly base and extending substantially horizontally;
wherein said support member is substantially aligned with said passage and wherein, as said circuit breaker assembly moves between said first and said second positions, said support member moves between a first position, wherein said support member is not disposed in said passage and a second position, wherein said support member is partially disposed in said passage; and
wherein, when said support member is in said second position, said support member bears a portion of the weight of said circuit breaker assembly base.

2. The guide assembly of claim 1 wherein, when said support member is in said second position, the longitudinal axis of each switching element is substantially aligned with a longitudinal axis of a contact insulator.

3. The guide assembly of claim 1 wherein:
said circuit breaker assembly base includes a housing; and
said passage extends through a portion of said circuit breaker assembly base housing.

4. The guide assembly of claim 3 wherein said circuit breaker assembly base housing includes a protrusion, said protrusion defines said passage.

5. The guide assembly of claim 4 wherein:
said circuit breaker assembly base housing includes a switching element side and a non-switching element side; and
said protrusion disposed at said circuit breaker assembly base switching element side.

6. The guide assembly of claim 4 wherein:
said circuit breaker assembly base housing includes a two generally horizontally aligned, spaced protrusions;
each protrusion having an aperture therein; and
said passage defined by the apertures in said protrusions.

7. The guide assembly of claim 4 wherein said protrusion is elongated, extending substantially the depth of said circuit breaker assembly base housing.

8. The guide assembly of claim 4 wherein:
said circuit breaker assembly base housing has a generally rectangular cross-section;
said circuit breaker assembly base housing includes two protrusions;
said protrusions disposed at opposite corners of said circuit breaker assembly base housing;
said guide assembly includes two elongated support members and a passage;
said support members coupled to and extending from said housing assembly rear sidewall; and
said protrusions defining said passages.

9. The guide assembly of claim 8 wherein:
said circuit breaker assembly base housing includes a first pair of generally horizontally aligned, spaced protrusions and a second pair of aligned, spaced protrusions;
each protrusion having an aperture therein; and
said first passage defined by the apertures in said first pair of protrusions, and, a second passage defined by the apertures in said second pair of protrusions.

10. The guide assembly of claim 8 wherein said protrusions are elongated and extend substantially the depth of said circuit breaker assembly base housing.

11. The guide assembly of claim 1 wherein:
said support member includes a proximal end and a distal end;
wherein said support member distal end is tapered.

12. The guide assembly of claim 11 wherein:
said passage includes a proximal end and a distal end; and
wherein said passage distal end is flared.

13. The guide assembly of claim 1 wherein:
said passage includes a proximal end and a distal end; and
wherein said passage distal end is flared.

* * * * *